United States Patent
Drescher et al.

(10) Patent No.: US 6,202,713 B1
(45) Date of Patent: Mar. 20, 2001

(54) METHOD AND DEVICE FOR SERIES CULTIVATION OF ORGANISMS

(75) Inventors: Thomas Drescher, Aachen; Juta Altenbach-Rehm, Ludwigshafen; Dirk Weuster-Botz, Aachen, all of (DE)

(73) Assignees: Forschungszentrum Julich GmbH; Dasgip Drescher Arnold; Schneider Gesellschaft fur Informations-und Prozesstechnologie mbH, all of (DE)

( * ) Notice: Subject to any disclaimer, the term of this patent is extended or adjusted under 35 U.S.C. 154(b) by 0 days.

(21) Appl. No.: 09/380,820
(22) PCT Filed: Mar. 17, 1998
(86) PCT No.: PCT/DE98/00696
  § 371 Date: Sep. 8, 1999
  § 102(e) Date: Sep. 8, 1999
(87) PCT Pub. No.: WO98/40467
  PCT Pub. Date: Sep. 17, 1998

(30) Foreign Application Priority Data

Mar. 8, 1997 (DE) .............................. 197 09 603

(51) Int. Cl.⁷ ................ B65B 3/04; C12M 1/36
(52) U.S. Cl. ............... 141/102; 435/286.5; 436/180
(58) Field of Search .................. 141/102, 130, 141/234, 237, 243; 422/100; 436/180; 435/286.5, 287.3, 3, 29

(56) References Cited

U.S. PATENT DOCUMENTS

| | | | |
|---|---|---|---|
| 3,172,235 | * 3/1965 | Bjorklund | 435/286.5 |
| 4,650,766 | * 3/1987 | Harm et al. | 435/286.6 |
| 4,900,683 | * 2/1990 | Metzger et al. | 436/179 |
| 5,289,846 | * 3/1994 | Elias et al. | 137/392 |
| 6,066,497 | * 5/2000 | Powell | 435/298.2 |

FOREIGN PATENT DOCUMENTS

| | | |
|---|---|---|
| 9419230 | 3/1995 | (DE) . |
| 1002987 | 9/1965 | (GB) . |

OTHER PUBLICATIONS

Translation of German Patent Document No. 9419230 Apr. 1995.*

* cited by examiner

*Primary Examiner*—Henry J Recla
*Assistant Examiner*—Peter deVore
(74) *Attorney, Agent, or Firm*—Connolly Bove Lodge & Hutz LLP

(57) ABSTRACT

The invention relates to a method and a device for series cultivation of organisms which is particularly suitable for providing organisms to be cultivated with a culture medium that has a toxic effect on said organisms at a high dosage, but when applied in appropriate dosage, said device determines the amount of substrate required to enable organisms to produce substances microbially in optimum conditions. According to the invention, a dosing schedule is predefined and the amount of substrate in the flask is adjusted according to actual requirements. In order to avoid underdosage, filling of the shaking flask no longer occurs according to a fixed predefined sequence.

26 Claims, 3 Drawing Sheets

METHOD AND DEVICE FOR SERIES CULTIVATION OF ORGANISMS

Figure 1:
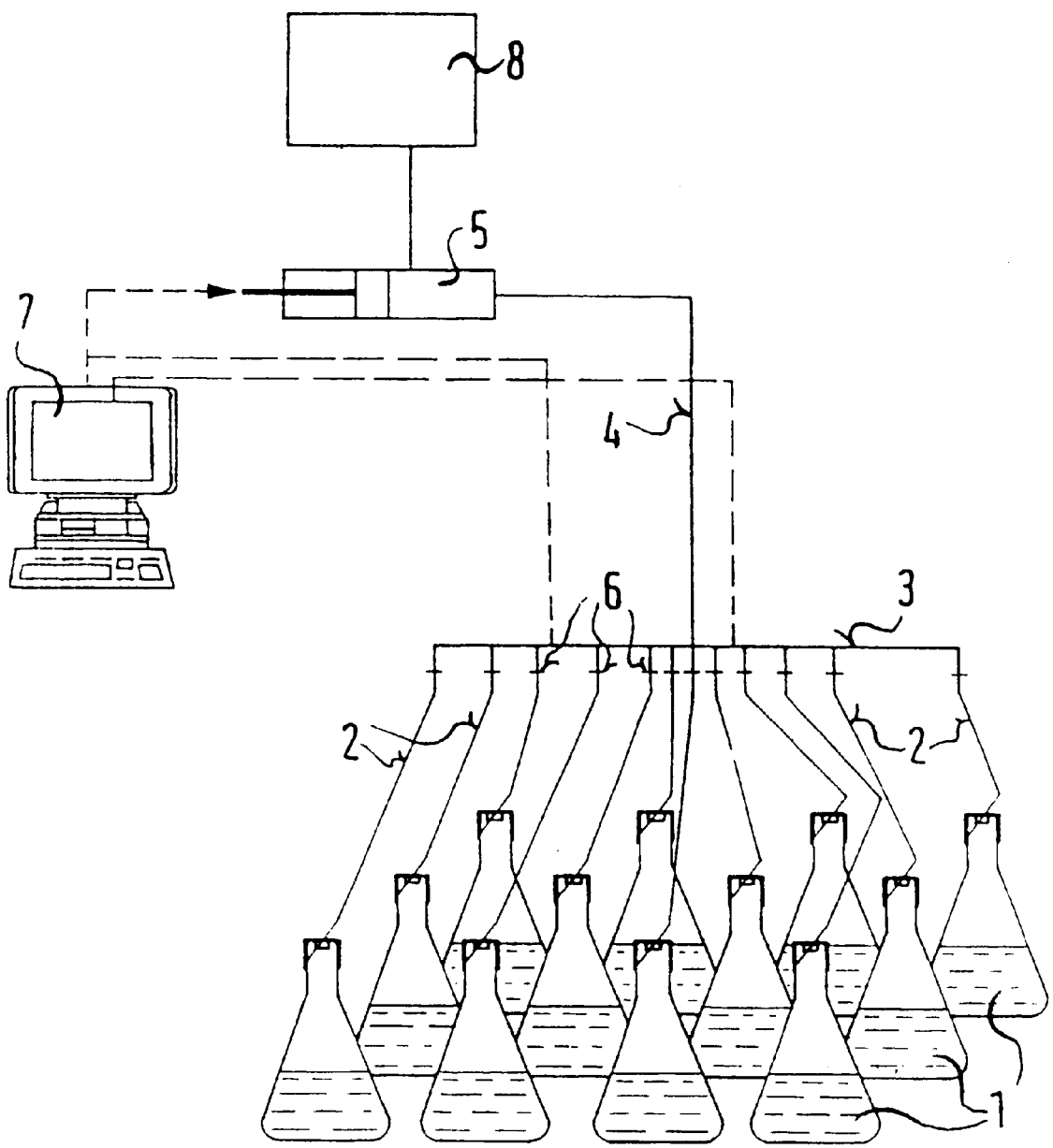

The invention relates to a process and a device for series cultivation of organisms. An aspect of this invention relates to a process and a device for dosing liquids in which a liquid from a liquid supply tank is dosed into at least one container by means of a dosing device controlled by commands from a computer.

The biotechnological preparation of substances employs microorganisms which, through expression of their genetic material or implemented vectors, are capable of producing these substances. In order to attain a cost-effective production of the substances, conditions have to be created for the organisms under which they are able to achieve their maximum production capacity. These conditions depend on external factors such as toxic influences and the correct filling with substrate that is needed for the growth and production of the substances. Thus, for example, it has been found that only in certain concentrations does the addition of a substrate lead to good results for the biotechnological production of substances. If the substrate is underdosed, not enough nutrients are available to result in a high production of the desired product. However, overdosing of the substrate can mean that the substrate is no longer used exclusively for the production of the desired substance but also that additional, undesired by-products are formed which give rise to impurities that then have to be isolated with a great deal of effort. Diverting substrate into the production of other, undesired compounds is even associated with a diminished production of the desired product. These factors have to be determined experimentally. One way to determine these factors is series cultivation in shaking flasks under varying conditions.

For instance, German Utility Model No. G 94 19 230.8 discloses a device in which shaking flasks are filled with substrate from a dosing device. The dosing device conveys the substrate into a multiport plug valve from which supply lines branch off that lead into the shaking flasks. In this device, the shaking flasks are filled with substrate one after the other, whereby the multiport plug valve is switched over to the next position each time. The device of the utility model is used when series experiments are used to determine the substrate quantities that constitute the optimal conditions of exposure for the organisms during the production of biochemically prepared products. With this device, however, it is also possible to supply microorganisms with substrate for which the substrate itself is toxic if it exceeds a certain concentration. The device should meet extremely high standards in terms of its dosing accuracy so that no overdosing occurs. Therefore, the device of German Utility Model No. G 94 19 230.8 is operated by a computer program by means of which the user specifies the amount of substrate to be dosed into each shaking flask in the form of a dosing schedule. The dosing schedule can be different for each shaking flask so that each shaking flask can then be subjected to different experiment conditions.

The device of the utility model does achieve some good results, but it also entails drawbacks. For example, the number of shaking flasks that can be filled at the same time is limited to sixteen positions due to the design of the multiport plug valve. Due to the constant switching over of the multiport plug valve, its service life is limited to about two months. Over the course of time, inaccurate dosing can occur as a result of wear and tear of the material. The multiport plug valve cannot be thermally sterilized since it is mechanically fabricated and changes occur in the structure of the multiport plug valve in response to temperature fluctuations, leading to a misalignment of the contact surfaces and thus to leaks. As a consequence, the device according to the utility model can only be sterilized with chemical agents. In this case, however, sterilization agents or their degradation products can be adsorbed on the walls of the valve or of the lines and can later be entrained into the shaking flask as the latter is filled during a subsequent dosing procedure. As a result, the metabolism of the organisms can be impacted upon, which can lead to erroneous experiment results.

Since the shaking flasks can only be filled one at a time, this method calls for a program which can take into account deviations from the dosing of the theoretically underlying dosing schedule. In this case, however, the deviations are not prevented right from the start but rather are merely corrected after the fact. A—potentially serious—underdosing vis-à-vis the actual target dosage can occur.

Moreover, the substrates to be dosed are usually highly viscous media that have to be fed in via conveying means during the filling of the shaking flasks. This gives rise to back pressure which slows down the dosing—in other words, not the entire amount of substrate that needs to be dosed is actually conveyed into the shaking flasks. After the theoretical dosing time has elapsed, the multiport plug valve is switched over to the next position and the backed-up amount of substrate is entrained into the next shaking flask. If a series of shaking flasks are dosed one after the other in this manner, a substrate quantity accumulates by the time the last shaking flask to be filled is reached, and this amount is discharged into a relief vessel after the end of a filling cycle. This essentially corresponds to the amount of substrate that was entrained because of the build-up of the back pressure and that was thus erroneously not dosed into the shaking flasks.

Due to the dosing sequence prescribed according to the state of the art, when different dosing functions are employed for the different shaking flasks, temporary underdosing can occur, which can no longer be remedied. As a result, the dosage present in the individual flasks deviates more and more from the actually desired target value as the experiment progresses.

Moreover, this entails operating downtimes, when the substrate supply has to be refilled after a cycle of filling operations. This prolongs the experiment times and leads to interruptions in the dosing which, in turn, does not result in an optimal adaptation of the substrate addition to the actually desired experiment series.

Therefore, it is the objective of the invention to create a process and a device with which dosing can be carried out that precisely meets the requirements in terms of the needed volumes at every point in time during an experiment. Toxic effects stemming from the substrate should be further minimized. Downtimes during operation should be reduced to a minimum and substrate entrainment should be avoided.

The device should also be thermally sterilizable and its service life should be ensured over prolonged periods of time without interruption due to maintenance work.

Thus, this invention provides a computer-controlled process and a device for carrying out the process in which liquid for a liquid supply tank 8 is dosed into at least one container 1 by means of a dosing device 5 controlled by commands from a computer, wherein:

a dosing schedule for each container is selected and programmed into the computer;

each container is dosed in accordance with the dosing schedule;

after each dose, the volume of liquid delivered to a container 1 is measured by the computer and stored in the computer as computer data;

each subsequent dose of liquid to each container 1 is selected by the computer in accordance with the data regarding the amount already dosed as well as in accordance with the dosing schedule, so that at the point in time for a subsequent dose, the volume of the dose corresponds to the actual requirement but is as least as large a minimum dosing volume that is the least that can be dosed.

With the process and the device according to the invention, a freely selectable number of shaking flasks can be filled more precisely with substrate without a predefined sequence. The individual shaking flasks are filled without overdosing, and substantial underdosing is avoided. Toxic effects and fluctuations in the substrate concentration can be diminished through better dosing. Contamination with antiseptics can be prevented and the maintenance-free duration of operation of the device can be prolonged. Downtimes during a series experiment are greatly reduced.

Advantageous embodiments are described subsequently.

The drawings schematically illustrate a device according to the invention as well as the dosing schedule.

The following is shown:

FIG. 1: a device for carrying out the process according to the invention.

Figure 2:
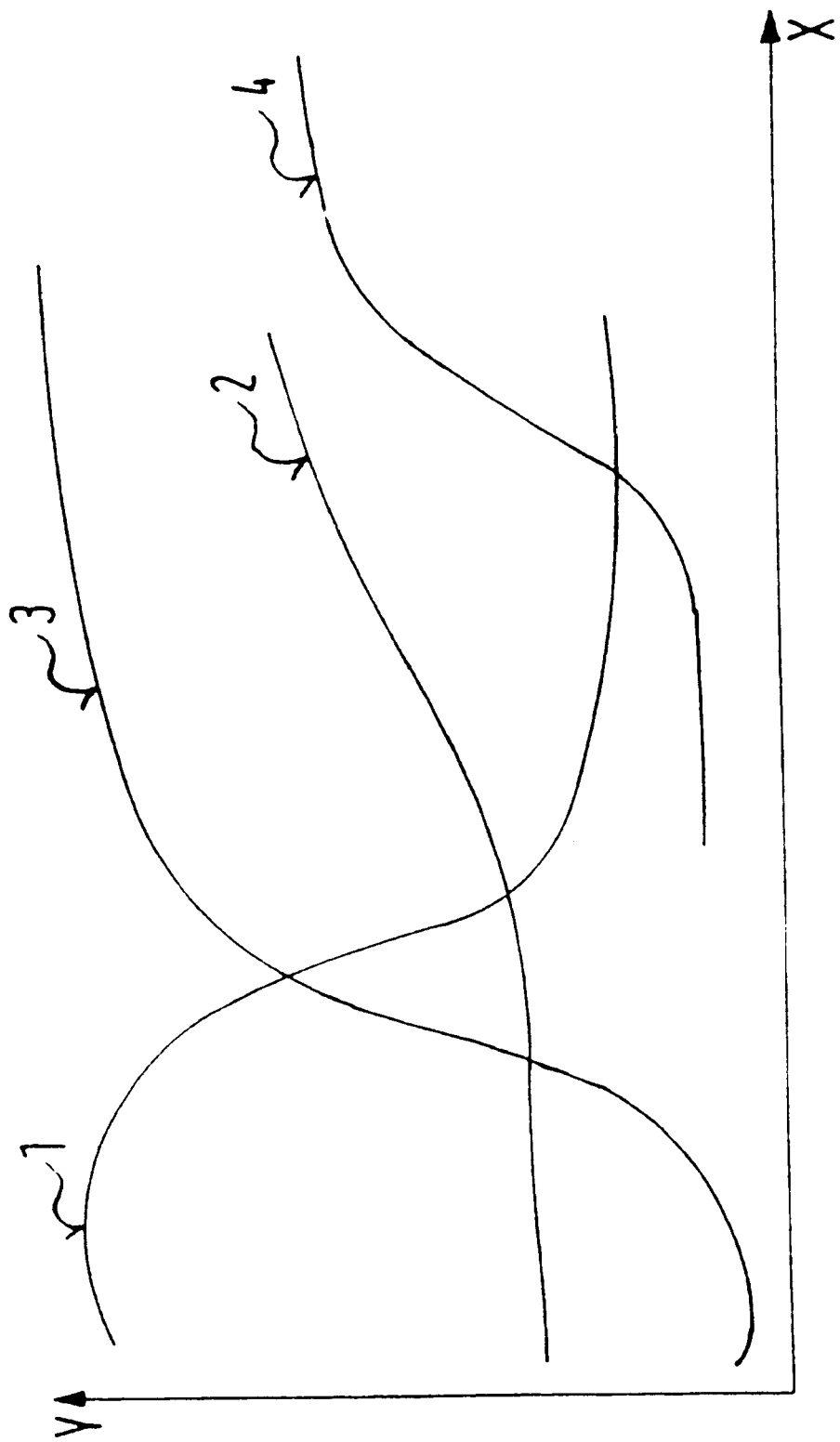

FIG. 2: a schematic representation of a dosing schedules for various shaking flasks.

Figure 3:
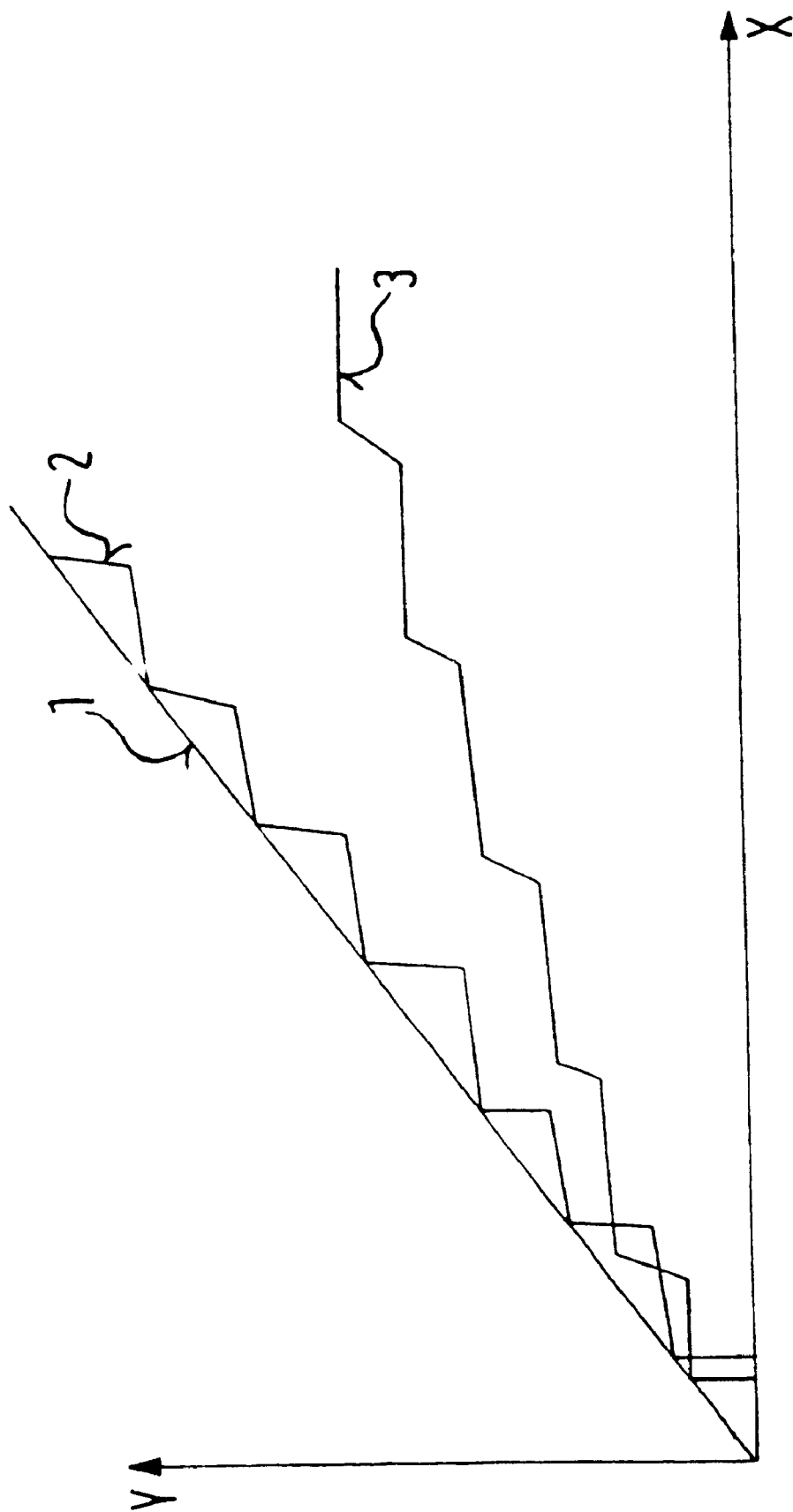

FIG. 3: a schematic representation of a dosing schedule for an individual shaking flask according to the invention in comparison to the state of the art.

In the device shown in FIG. 1, shaking flasks 1 as containers for bacteria suspensions are connected via supply lines 2 to a distributor 3 that is linked via a feed line 4 to a liquid supply tank. The supply lines 2 are connected to the distributor 3 via 2/2-way valves 6. The dosing device 5 is connected to a computer 7 which, in FIG. 1, is indicated by a broken line. Each 2/2-way valve 6 is likewise connected to the computer 7 via control lines.

In FIG. 1, however, only two control lines are indicated by broken lines as examples. The dosing device 5 is supplied with substrate via a liquid supply tank 8.

FIG. 2 shows examples of dosing schedule curves 1 through 4 for four different shaking flasks 1. In this figure, the abscissa x depicts the time (without a unit) and the ordinate y is the amount of substrate to be dosed (without a unit). It can be seen how the amount of substrate to be dosed as well as the change over time of the quantity of substrate to be dosed can differ for the various shaking flasks 1.

In FIG. 3, the abscissa x shows the time and the ordinate y shows the volume amount of substrate (both without a unit). The course depicted by the straight line 1 characterizes the envisaged dosing function prescribed by the computer program. The step function 2 shows the dosing sequence of the process according to the invention. By way of comparison, the step function 3 shows the dosing sequence according to the state of the art as disclosed in German Utility Model No. G 94 19 230.8.

FIG. 3 shows how the dosing in the process according to the invention is adapted to the actually specified requirement in each dosing step, whereas with the state of the art, the deviation from the setpoint values of the dosing increases continuously.

During operation, the dosing device 5 is filled with a substrate that serves to supply nutrients to the organisms that are in the shaking flask 1. The substrate liquid is conveyed through the feed line 4 at a defined speed into the distributor 3. The 2/2-way valves 6, which are preferably configured as constricted tube valves, are connected to the distributor 3. When the shaking flasks 1 are filled with substrate, the constricted tube valves are actuated by the computer 7 and are thus opened. The substrate flows through the supply lines 2 into the shaking flasks 1, thereby reaching the suspension of the bacteria strains to be fed. The desired dosage of substrate per unit of time is prescribed as a dosing schedule. Here, only one shaking flask is actuated at a time, and the sequence of the dosing is selected as desired.

According to the invention, the dosing device 5 is connected to the computer 7 via a control line in such a way that the amount of substrate dosed in each case (for example, glucose) is recorded and stored in the computer 7. The amount of substrate dosed at each point in time is thus known. For physical reasons, dosing is not practicable at every point in time since the amount of substrate to be dosed cannot be less than the minimum amount that can actually run off due to the viscosity of the substrate liquid and because of variables such as adhesion, the minimum possible size of a droplet—or, if no droplets are formed, because the liquid to be dosed runs off the wall of the shaking flask. Therefore, the dosing step is only carried out when the amount of substrate to be dosed exceeds this minimum amount—about 20 $\mu$l to 30 $\mu$l. Then, at the time of the dosing, an amount of substrate is fed in that can, in fact, be larger than the minimum possible dosing amount and that corresponds to the actual requirement. This amount is determined by comparing the dosing schedule that is stored in the computer 7 with the actually dosed amount of substrate previously determined with the dosing device 5. Via a serial interface, the dosing device 5, which is configured as a piston pump here, is instructed by the computer 7 to dose the calculated amount. After the time needed for the dosing has elapsed, the computer checks again whether the pump has dosed the specified amount before it continues with the next dosing operation. This avoids overdosing and deviation from the dosing level toward lower values.

Since the amount of substrate already dosed into each shaking flask 1 is known from the data communication between the dosing device 5 and the computer 7 and can then be compared to the dosing schedule, the use of a distributor 3 ensures that dosing is always possible with the substrate that is most urgently needed. The supply of each individual shaking flask 1 is thus possible in a way that meets the momentary requirements. This is also a result of the independence of the dosing on a fixed predefined sequence. Moreover, after each dosing into a shaking flask 1, a substrate-specific waiting period is observed which depends, for example, on the flowability of the substrate, before further dosing into the next shaking flask 1 is carried out. In this manner, the substrate that flows sluggishly through the dosing device 5 as a result of the back pressure is completely emptied into the shaking flask, thereby preventing entrainment into the next shaking flask 1. In this context, the decrease in the back pressure also serves to determine whether the substrate has been completely dosed. According to the invention, the determination of the amount of substrate dosed into each shaking flask 1 leads to the determination of the total amount of substrate dosed into the shaking flask 1, so that, on the basis of this value, it is possible to determine how much substrate has been taken from the liquid supply tank 8. Filling up the liquid supply tank 8, which takes a lot of time because of the high viscosity, only has to be done once there is an actual need, as a result of which the downtimes in the operation of the device according to the invention are greatly reduced. Frequent interruptions in the supply of the shaking flasks 1 with substrate are reduced to a requisite minimum.

Through the individual processing of each shaking flask 1, substrate can be supplied individually and independently of waiting times for cyclically recurring filling procedures. There is no longer a fixed dosing sequence, as a result of which the filling volumes per dosing procedure can be reduced, which is advantageous for substrates that have toxic side effects. The dosed amount of substrate is precisely adapted to the actual requirement or to the actual instructions at a given moment. It is also possible to fill a shaking flask 1 more often, which is what allows the smaller dosing amounts, since less frequent filling in conjunction with the longer waiting times for a filling means that it is necessary to accept higher surpluses of substrate in the supply tank. Now, dosing only takes place as the need arises.

According to the invention, the dosing is only carried out once the calculated difference between the setpoint and the actual volumes to be dosed exceed the selected minimum volume for a dosing procedure. The entire actually needed nutrient difference is dosed. As a result, the supply of substrate can be well adapted to the actual need, and toxic effects are minimized.

After the dosing has been carried out via the constricted tube valves that are arranged in parallel, the filling pressure in the supply line 2 is relieved into the shaking flask 1 to be filled with substrate. According to the state of the art cited in German Utility Model No. G 94 19 230.8, it was necessary to undertake pressure relief separately into a specially provided pressure-relief tank. This step can now be eliminated, which leads to a more efficient operation of the device according to the invention, since a switch-over procedure can be dispensed with. Entrainment due to the switching over of a multiport plug valve and thus dosing inaccuracies decrease vis-à-vis the state of the art. This enhances the precision.

The use of constricted tube valves also makes it possible to thermally sterilize the parts through which the substrate flows during the dosing since no individual parts of a mechanical structure of the valve can be deformed by heat, thereby becoming misaligned, since they no longer come into contact with the sterilization steam. As a result, the surfaces of the parts of the device that come into contact with the substrate are not contaminated by chemicals and no chemical degradation products of the sterilization agent such as, for example, methanol, can form which, in turn, would have a cytotoxic effect. Dispensing with the chemical disinfectants such as dimethyl carbonate also prevents $CO_2$ formation due to the degradation of the disinfectant. According to the state of the art, it was necessary to flush the system with degassed substrate after a chemical disinfection procedure since otherwise, $CO_2$ would remain in the valves or tubes which, in turn, could lead to erroneous dosing during operation. It is now possible to dispense with this flushing with degassed substrate without having to put up with sources of error. In this way, it is also possible to cut costs in terms of the expensive substrate.

The configuration of the valves as constricted tube valves also allows the flawless feed of substrates into the shaking flasks 1 which contain pieces of matter such as solid nutrient constituents or particles of medications. Particles can also be granular or fibrous particles that form a nutrient depot in the substrate; they have a diameters of about 10 $\mu$m to 100 $\mu$m. Cross section constrictions of the type found in multiport plug valves do not have to be anticipated. The cross sections of the tubes used for the operation of the constricted tube valves can be selected at will. However, in actual practice, small tube cross sections of 2 to 3 mm have been found to be preferable since small cross sections minimize dead spaces in which, for example, thermal effects could lead to denaturing.

With the device according to the invention, it is now possible to fill an unlimited number of shaking flasks with microorganisms, independent of a prescribed sequence, with greater precision and reducing toxic influences. The use of the device is, of course, not restricted to the dosing of substrate into flasks containing microorganisms; on the contrary, other dosing procedures can be carried out with the device. Examples are the feeding of reagents into flasks in which chemical reactions take place.

What is claimed is:

1. Process for dosing liquids in which a liquid from a liquid supply tank (8) is dosed into at least one container by means of a dosing device (5) and in which the amount of liquid to be filled into the container is stored in a computer (7), characterized by the following steps:

programming a dosing schedule for a container, filling a container with a volume prescribed according to a dosing schedule calculating and storing the volume of liquid added adding another volume of liquid that is calculated on the basis of the amount already dosed and stored in the computer as well as on the basis of the dosing schedule, and thus that at the point in time of this dosing, corresponds to the actual requirement at a dosing point in time at which the calculated amount of liquid actually to be dosed does not fall below a minimum dosing volume that is the least that can be dosed.

2. Process according to claim 1, characterized in that the dosing into the containers is carried out in a sequence in which the next container into which the dosing is carried out is the one in which the amount of liquid already present in the container deviates most from the prescribed dosing schedule.

3. Process according to claim 1, characterized in that, after a dosing step, a waiting period is observed that allows the liquid to flow completely into the container before the next container is filled.

4. Process according to one of the claim 1, characterized in that the liquid supply tank (8) is only refilled when a total consumption of liquid has been calculated that corresponds to the volume present in the liquid supply tank (8).

5. The process according to claim 1, wherein the liquid is dosed by means of a dosing device, and a 2/2-way valve for each container.

6. Device comprising a liquid supply tank (8), a dosing device (5), a computer (7), a feed line (4) connected to the dosing device (5) and to the liquid supply tank (8) as well as at least one container that is connected to the dosing device (5) via a supply line (2), characterized in that the computer (7) is connected to the dosing device (5) as well as to valves that open and close the supply lines (2) via control lines, whereby a dosing schedule programmed for each container is programmed in the computer (7), so as to control the filling of a container as follows:

filling a container with a volume prescribed according to a dosing schedule calculating and storing the volume of liquid added adding another volume of liquid that is calculated on the basis of the amount already dosed and stored in the computer as well as on the basis of the dosing schedule, and thus that at the point in time of this dosing, it corresponds to the actual requirement at a dosing point in time at which the calculated amount of liquid actually to be dosed does not fall below a minimum dosing volume that is the least that can be dosed.

7. Device according to claim 6, characterized in that it comprises means to ensure that the dosing into the containers is carried out in a sequence in which the next container into which the dosing is carried out is the one in which the amount of liquid already present in the container deviates most from the prescribed dosing schedule.

8. Device according to claim 6, characterized in that the device has means to ensure that, after a dosing step, a waiting period is observed that allows the liquid to flow completely into the container before the next container is filled.

9. Device according to claim 6, characterized in that the device has means to ensure that the liquid supply tank (8) is only refilled when a total consumption of liquid has been calculated that corresponds to the volume present in the liquid supply tank (8).

10. Device according to claim 6, characterized in that it comprises a distributor (3) that is equipped with constricted tube valves.

11. The device according to claim 6, wherein the at least one container is connected to the dosing device via a supply line and a feed line and a 2/2-way valve or, if only one container is used, then via a feed line.

12. The device according to claim 11, wherein the 2/2-way valve is a constricted tube valve.

13. A computer-controlled process for feeding a plurality of liquid doses to a plurality of biological media, wherein adequate flow properties for dispensing the liquid doses essentially in their entirety to each biological medium cannot be obtained unless each liquid dose is at least as great as a predetermined minimum volume, said process comprising:

a. selecting an effective feed rate for at least one of the biological media and selecting a minimum volume for each liquid dose, and storing at least one feed rate and said minimum volume in the computer as minimum dose volume data and as data representing an amount dispensed-vs.-time curve, b. in response to a signal from the computer based on stored data related to a feed rate, delivering in its entirety a first liquid dose, at least as large in volume as said predetermined minimum volume, to a first biological medium, in accordance with said feed rate, c. generating computer data corresponding to a measurement of the volume of liquid delivered to the first biological medium in said step (b) and storing the thus-generated data in said computer, d. repeating said steps (b) and (c) with respect to the other biological media, thereby generating body of stored data in said computer corresponding to the measurements of volume of liquid dispensed, e. generating with said computer calculated dose-timing data, based upon said thus-generated data of steps (c) and the predetermined feed rate related to said first biological medium, and controlling the timing of the dispensing of a second liquid dose to said first biological medium so as to conform essentially to said amount-dispensed vs. time curve for that biological medium and so as to conform to said minimum dose volume data, f. repeating said step (e) for the other biological media and with respect to the relevant feed rate for each biological medium.

14. Process according to claim 13, wherein said steps (e) and (f) are repeated several times with respect to third and subsequent liquid doses to continue the feeding of liquid doses to said biological media.

15. Process according to claim 13, wherein the computer delays the delivery of liquid to each container for a time specific to characteristics of the liquid so that no subsequent dose is delivered until the immediately preceding dose has been fully delivered to a container.

16. A device for carrying out the process of claim 13, comprising:

a plurality of containers 1 for containing biological media,
   a computer 7 for receiving and storing data and for controlling the timing and volume of doses delivered to each container 1,
   a plurality of feed lines 2 communicating with said containers at one end of each said feed line 2 and communicating with a liquid distributor 3 at each other end of each said feed line 2,
   a computer-controlled valve 6 placed in each feed line 2 for releasing a liquid dose to a container 1,
   a dosing device, controlled by the computer and supplied from a liquid supply tank 8, for delivering computer-timed liquid doses to the liquid distributor 3,
   the computer 7 having programmed means for:
      storing a feed rate program for each container 1,
      storing data corresponding to a minimum dosing volume that is the smallest volume that can be dosed accurately,
      operating each valve 6 so as to release doses to each container 1 in accordance with the relevant feed rate program,
      generating and storing data corresponding to each dose fully released to each container 1 and the cumulative dosage released to each container 1, and
      timing each subsequent dose released to each container 1 in accordance with said feed rate program but with a sufficient delay so that the amount of liquid actually delivered to each container 1 does not fall below said minimum dosing volume.

17. A device according to claim 16, wherein the computer 7 stores liquid-specific data relating to the amount of time required to deliver a liquid dose in its entirety to a container 1.

18. Process for dosing liquids in which a liquid is dosed into at least one container and in which the amount of liquid to be dosed into the container is stored in a computer, characterized by the following steps:

programming a dosing schedule for a container,
   filling the container with a volume prescribed according to the dosing schedule
   calculating and storing the volume of liquid added
   adding another volume of liquid that is calculated on the basis of the amount already dosed and stored in the computer, as well as on the basis of the dosing schedule, such that the dosing corresponds to the actual requirement at that point in time, but wherein the actual dosing time does not precede the time calculated to be the time at which at least a minimum dosing volume is required, wherein the minimum dosing volume is the least that can be dosed.

19. Process according to claim 18, wherein the dosing is carried out in a sequence in which the next container into which the dosing is carried out is the one in which the amount of liquid already present in the container deviates most from the prescribed dosing schedule.

20. Process according to claim 18, wherein a waiting period follows the dosing to allow the liquid to flow completely into the container before the next container is dosed.

21. Process according to one of the claim 18, wherein a dosing device is refilled only when a total consumption of liquid has been calculated that corresponds to the volume present in the dosing device.

22. Device comprising a dosing device, a computer, at least one tubing connecting the dosing device to at least one container, and one valve for each of the at least one tubings directly connected to each of the at least one container and the computer is connected to the dosing device and to all of the at least one valves, whereby a dosing schedule programmed for each container is programmed in the computer, so as to control the filing of the at least one container as follows:

filing the container with a volume according to a dosing schedule calculating and storing the volume of liquid added adding another volume of liquid that is calculated on the basis of the amount already dosed and stored in the computer, as well as on the basis of the dosing schedule, such that the dosing corresponds to the actual requirement at that point in time, but wherein the actual dosing time does not precede the time calculated to be the time at which at least a minimum dosing volume is required, wherein the minimum dosing volume is the least that can be dosed.

23. Device according to claim 22, comprising means to ensure that dosing is carried out in a sequence in which the next container into which the dosing is carried out is the one in which the amount of liquid already present in the container deviates most from the prescribed dosing schedule.

24. Device according to claim 22, comprising means to ensure that a waiting period can follow the dosing to allow the liquid to flow more completely into the container before the next container is dosed.

25. Device according to claim 22, wherein the dosing device is refilled only when a total consumption of liquid has been calculated that corresponds to the volume present in the dosing device.

26. Device according to claim 22, which comprises at least one constricted tube valve.

* * * * *